(12) United States Patent
Wörtge et al.

(10) Patent No.: US 6,209,396 B1
(45) Date of Patent: Apr. 3, 2001

(54) METHOD AND APPARATUS FOR TWO-DIMENSIONAL VIBRATION ANALYSIS

(75) Inventors: Michael Wörtge, Karlsruhe; Matthias Schüssler, Karlsbad-Spielberg, both of (DE)

(73) Assignee: Polytec GmbH, Waldbronn (DE)

( * ) Notice: Subject to any disclaimer, the term of this patent is extended or adjusted under 35 U.S.C. 154(b) by 0 days.

(21) Appl. No.: 09/251,191

(22) Filed: Feb. 16, 1999

(30) Foreign Application Priority Data

Feb. 16, 1998 (DE) .............................. 198 06 240

(51) Int. Cl.⁷ ..................................... G01H 9/00
(52) U.S. Cl. ............................. 73/657; 356/356
(58) Field of Search ................ 73/657, 655, 1.85; 356/345, 354, 356

(56) References Cited

U.S. PATENT DOCUMENTS

| | | | |
|---|---|---|---|
| 5,679,899 | 10/1997 | Webster et al. | 73/656 |
| 5,822,450 * | 10/1998 | Arakawa et al. | 382/152 |

FOREIGN PATENT DOCUMENTS

| | | |
|---|---|---|
| 31 13 090 A1 | 10/1982 | (DE) . |
| 36 22 421 A1 | 2/1988 | (DE) . |
| 29 52 809 C2 | 6/1990 | (DE) . |
| 41 06 572 C2 | 6/1993 | (DE) . |

OTHER PUBLICATIONS

Michael Sykes, "Laser–Abtastkopf in der Koordinatenmeβtechnik", Feinwerktechnik & Messtechnik, 95, (1987) 1, pp.55, 56.

B. Stoffregen, "Flächenabtastendes Laser–Doppler–Schwingungsanalysesystem", Technisches Messen, 51, Jahrgang, (1984) No. 11, pp, 394–397.

Bernd Breuckmann, "Bildverarbeitung und optische Meβtechnik in der industriellen Praxis", Franzis Verlag, München, (1993), pp. 256, 269–272.

* cited by examiner

Primary Examiner—John E. Chapman
(74) Attorney, Agent, or Firm—Akin, Gump, Strauss, Hauer & Feld, L.L.P.

(57) ABSTRACT

A method and an apparatus are provided for contact-free optical displacement and/or vibration measurement of an object, in which the object to be measured is scanned in the form of a grid. The position of the measurement points and the contour of the grid are freely selectable. Individual measurement point subquantities, to be analyzed respectively in correlation with one another, can be classified in different categories and analyzed as a function of the category to which they are assigned.

17 Claims, 1 Drawing Sheet

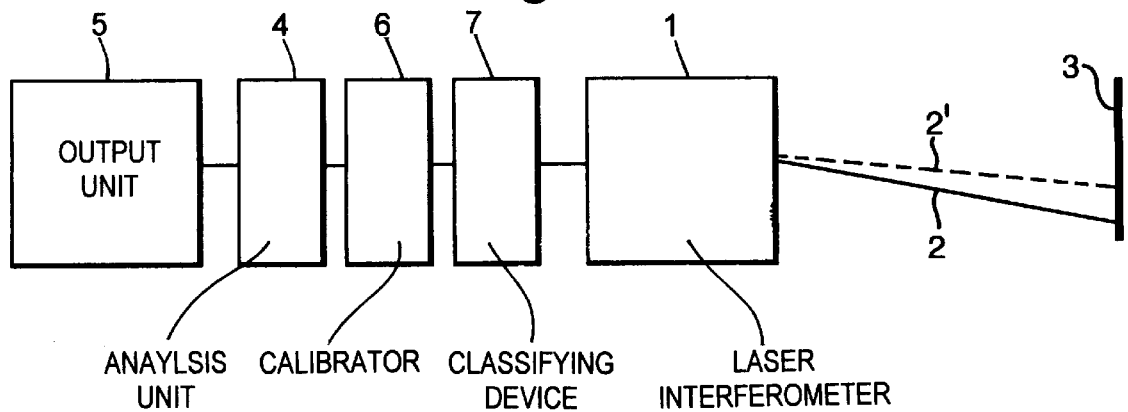
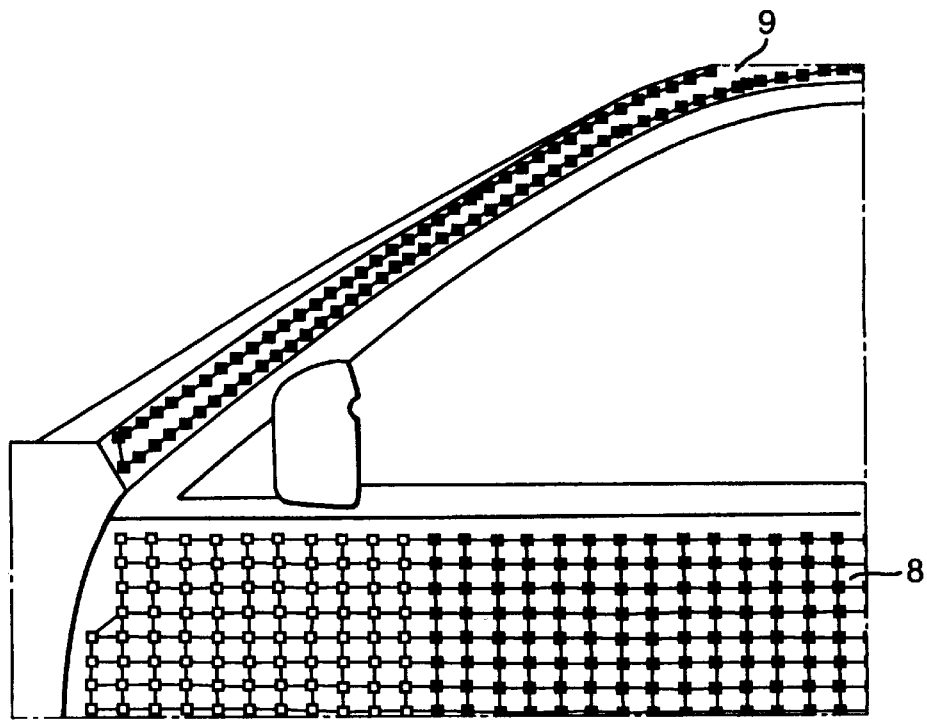

METHOD AND APPARATUS FOR TWO-DIMENSIONAL VIBRATION ANALYSIS

BACKGROUND OF THE INVENTION

The invention relates to a method for contact-free, optical displacement- and/or vibration measurement of an object by means of at least one interferometer with at least one laser, at least one control unit which guides the laser beam to a plurality of points of the object to be measured, so that the object is scanned by the laser beam, and at least one output unit for the high-resolution display of the measurement results. The invention further relates to an apparatus for the implementation of the method.

Such a method and apparatus are known from DE 31 13 090 A1 in which the following procedure is performed: a video image of the structure to be investigated is recorded, and a rectangular grid of measurement points is inserted into this video image using a computer. In this way, a rectangular grid of measurement points is superimposed upon the object to be measured. The object to be measured is set in vibration, and the laser beam of an interferometer is directed toward the predefined grid points under the control of the computer. At each of these points the vibration spectrum is recorded in a contact-free manner by this interferometer. Following the measurement, the individual vibration spectra are analyzed in the computer, and the vibration image of the object is reconstructed for individual frequencies selected from the vibration spectrum. These vibration images are output by an output unit (image screen).

Optionally, individual measurement points can also be erased from the measurement grid.

This method and the associated apparatus are disadvantageous inasmuch as the arrangement of the measurement points in a predetermined grid is unsatisfactory for the analysis of vibrations with complicated geometric configurations. These can be recorded only by means of an extremely large number of measurement points, with the result that the measurement can no longer be performed in a reasonable period of time.

Additionally, for the analysis of vibration modes, in particular of car doors or the like, it is known to arrange individual sensors at different points of the workpiece to be measured. The sensors are accelerometers which, on the one hand, falsify the measurement result by virtue of their own bulk and, on the other hand, cannot be attached in the desired amount or at all the desired locations. Particularly in the case of small workpieces, the use of such bulky accelerometers rapidly becomes subject to insuperable limitations.

SUMMARY OF THE INVENTION

Proceeding from this, an object of the invention is to provide a method and apparatus which enable vibration analysis to be performed even in the case of workpieces which have a complicated geometric configuration or are very small.

This object is achieved in accordance with the invention in that, for a scanning process, the measurement points are freely positioned on the object to be measured, individually and/or in at least one grid adaptable in its contour, wherein different measurement point sub-quantities to be analyzed in correlation with one another are classified in different categories and are analyzed as a function of the category to which they are assigned.

Whereas previously in scanning processes, a surface or an object to be measured (also referred to herein as "measured object") was covered with a rectangular and right-angled grid and measured point by point, wherein it was possible to vary the size of the grid, density of points and number of points at which measurement was to take place, the method according to the invention facilitates a substantially more adapted procedure.

In this procedure one generally simply defines the surface on which scanning is to take place, for example by marking its outline on the screen with the mouse, and then fills this freely defined surface with measurement points using the computer. For this purpose, for example, the number of measurement points or their density and other parameters are input into the computer.

Thus, for example, in the case of a circular measured object, a circular grid pattern is defined, the contour of which is thus adapted to the measured object. On the other hand, in the case of an obliquely extending, rod-shaped measured object, a grid of the same configuration is created. In this way, the measurement points can be positioned precisely on the measured object, whereas in the conventional procedure surface-covering and precise positioning of the measurement points on the measured object is not possible in the case of complicated geometric configurations.

If the vibration characteristic of a measured object is to be investigated, it is generally insufficient to define a number of measurement points in an arbitrarily selected geometric shape on the two-dimensional image of the measured object. Rather, an interpolating correlation must be established between the individual measurement points of a measured object or a part of the measured object to permit analysis of the vibration characteristic. Here, it is particularly advantageous to define different categories in which different sub-quantities of the measurement points to be analyzed in correlation with one another are classified.

Thus, for example, it is possible for a three-dimensional measured object to be covered with a two-dimensional measurement point grid which also takes into consideration the third dimension in the analysis: for example, a cable could extend at some distance in front of a planar measured object in the beam path of the laser beam. From the imaging on a two-dimensional grid, the analysis unit does not initially recognize that the measurement points situated on the cable have nothing to do with the planar measured object and must not be correlated in the analysis, so as not to falsify the measured vibration characteristic of the planar measured object. However, it is necessary for the measurement points situated on the planar measured object on both sides of the cable to be correlated respectively with one another and to be interpolated in order to permit a complete analysis of the vibration characteristic of the planar measured object.

The method according to the invention now offers the possibility, for example, of defining a rectangular grid on the planar measured object considered in the present example, and at the same time of placing a polygon of measurement points over the cable considered in the present example, wherein the measurement points situated on the cable are classified in a first category, and the remaining measurement points of the grid are classified in a second category and are respectively separately analyzed.

To simplify handling, category types assigned to different geometric objects, such as circles, ellipses, lines, etc., can be pre-defined. The individual category types can be provided with grid types, such as rectangular, hexagonal, polar, etc., and with standardized features for the data acquisition, such as the number of averaging operations, the measurement duration, and the number of measured values.

The measurement points can also be classified in different categories in accordance with the expected vibration characteristic, or can also be classified subsequently in accordance with the measured vibration characteristic, and the measurement points can be individually measured, displayed and/or analyzed in accordance with the category to which they are assigned. It is thus possible to separately record and display different regions of the measured object which vibrate with a common phase in themselves, albeit not with one another. For example, in the case of the measurement of a disc brake of a motor vehicle, the brake disc can be covered with measurement points of a circular category type filled with a polar grid. In the same operating step, the calliper is then measured with a polygonal category type filled with a dense, hexagonal grid and also having additional measurement points at the edge.

As already shown by the described examples, within the scope of the invention it is possible to define a plurality of grids for a scanning process, for example if a circular and a rod-shaped object are to be measured simultaneously.

Alternatively, it is also possible to select a plurality of individual measurement points which then together form a grid.

It is equally possible to apply measurement points to freely defined curves (polynomials), for example in order to measure narrow objects or the edge of an object.

According to our experiments, discrepancies can occur between the position of the measurement points in the output unit, on the one hand, and the position of said measurement points on the measured object, on the other hand. Such discrepancies can be caused by distortions of lens systems used in the imaging of the object or distortions in the projection of the laser beam onto the object to be measured. The scanning of the object to be measured is also affected by the motor-driven rotation of mirrors. Upon the rotation of the mirrors, the laser beam moves over an approximately cylindrical surface. As the measured object generally has a different geometric configuration, further distortions arise. Such distortions would manifest themselves in a disadvantageous manner, in particular in association with the newly achieved free positionability of measurement points and groups of measurement points, for example if measurement points extend along the edge of a measured object or for example along a welding seam or a row of rivets; in such cases it is particularly important that the measurement actually be performed in a geometrically correct manner and not be falsified by optical distortions.

Therefore, it is proposed that the position of the measurement points in the output unit should not be directly taken from their position on the object to be measured, but be calculated via a correction process, in particular via one or more coordinate transformations. The coordinate transformations can be performed using transformation matrices and, if necessary, are also non-linear.

To create the correction process, a set of values is formed containing positions of measurement points on the object and their associated positions in the high-resolution display of the output unit. Depending upon the type of the distortions, different correction algorithms, such as for example multidimensional, polynomial, compensating curves, can be used.

In the case of complicated geometric configurations, which can be measured particularly well by means of the process according to the invention, complicated vibration phenomena can occur. To take this better into account, as already mentioned in the foregoing, it is preferably provided that the measurement points be classified in different categories in accordance with the expected or the measured vibration characteristic, and that the measurement points be individually measured, displayed and/or analyzed in accordance with the category to which they are assigned.

If the classification is performed prior to the scanning process, the measurement duration or other measurement parameters can also be specifically preselected for individual categories. For example, regions of the measured object which vibrate particularly slowly can thus be measured for a longer period of time.

For the positioning of the measurement points, their high resolution display in the output unit is advantageously based on an image of the measured object. This can be a stored image from a CAD system or a previously made digital or digitalized recording. It is also possible to gate-in a real-time image from a synchronously operating video camera.

If such an image is available, the classification can naturally be performed on the basis of this image. Here, it is also possible to use modern imaging processes which simplify the definition of the grid contour in computer assisted manner.

The apparatus according to the invention for the implementation of the previously described method is characterized in that for a scanning process, measurement points can be positioned individually and/or in at least one grid adaptable in its contour, that the measurement points for this positioning can be displayed in the output unit so that they can be placed at the desired location, and that different measurement point sub-quantities to be analyzed in correlation with one another can he classified in different categories by means of a classifying device and can be analyzed as a function of the category to which they are assigned.

Further advantageous embodiments of the apparatus are disclosed below in the detailed description and in the sub-claims relating to the apparatus, corresponding to the detailed description and sub-claims of the process.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1 is a block diagram of the apparatus according to the invention; and

FIG. 2 shows an arrangement of grids, which are adapted in their contour, on an object to be measured.

DETAILED DESCRIPTION OF THE INVENTION

FIG. 1 illustrates a laser interferometer 1 which preferably has the form of a heterodyne vibrometer and from which a laser beam 2 is transmitted, for interferometric measurement, to an object 3 to be measured. For the scanning of the measured object 3 with the laser beam 2, the interferometer 1 comprises a lens and mirror arrangement (not shown). This is set such that the laser beam 2 strikes the object 3 to be measured at a desired measurement point. It remains here for a few vibration cycles in order to perform an interferometric measurement of vibration frequency, amplitude and phase.

Then the lens and mirror arrangement of the interferometer 1 is adjusted by motor control and/or via piezo elements, such that the laser beam is guided towards the next measurement point on the object 3 to be measured, where it scans the aforementioned variables in the new position 2'. This process is repeated until all the measurement points have been recorded.

The measured values are forwarded from the interferometer 1 to an analysis unit 4 in the form of a computer which conditions the data for the high-resolution display in an output unit 5 (screen).

Here, it is of essential significance that the lens and mirror arrangement does not control the laser beam in such manner that the beam scans the object 3 to be measured in a fixed, rectangular grid pattern. Rather, the laser beam is deflected such that for a scanning process, measurement points are positioned individually and/or in at least one quasi-variable grid whose contour is adapted to the region to be measured.

To define this contour, it is also essential that the measurement points for this positioning can be displayed in the output unit 5.

This high-resolution display of the measurement points is based on an image of the measured object, so that the desired position of each individual measurement point can easily be found. This image can be produced particularly well by means of a video camera connected to the output unit 5.

In general, the optical system of the video camera and the lens and mirror arrangement of the interferometer 1 are subject to faults. In order nevertheless to produce congruency between the actual position of the measurement points on the measured object 3, their setting in the lens and mirror arrangement of the interferometer 1, and their display in the output unit 5, the device comprises a calibrator 6. Via transformation matrices this calibrator respectively performs a coordinate transformation between two of the three aforementioned systems. The position of a measurement point on the measured object 3 is thereby assigned the correct position in the high-resolution display of the output unit 5.

The setting of the calibrator is effected by recording a set of values of positions of a few measurement points on the object and the positions of said measurement points in the output unit. The transformation matrices are calculated therefrom. In addition, here it is possible to include the particular setting of the lens and mirror arrangement of the interferometer 1 for each measurement point, so that calibration also takes place for this purpose.

The calibration of the laser positioning is performed most easily using an image of the measured object continuously produced by a video camera. The laser is directed toward a selected calibration point marked in the video image. Here, the absolute position of the lens and mirror arrangement is recorded. This process is repeated for all the desired calibration points. Then the calibration parameters are calculated. The occurring distortions are interpolated and corrected by a polynomial compensating curve. An example of a correcting algorithm will be described in detail in the following for the frequently occurring pin-cushion distortion of a scanner:

The user moves the laser beam to an arbitrary number of calibration points and marks these in the video image. A polynomial actuation system is set up in order to perform a mathematical regression by means of which the pin-cushion structure, which the laser beam would approach instead of the desired rectangle in the absence of a correcting algorithm, is restored to a rectangle. Taking only one axis into consideration, this yields for example:

$$U_x = \arctan(a_0 \cdot x + a_2 \cdot x^2 + a_3 \cdot x^3 + \ldots)$$

wherein $U_x$ is the mirror voltage, $a_0$, $a_1$, etc are the parameters defined in the correcting algorithm and x is the coordinate of the laser on the video image. With such a correcting algorithm, in particular disturbances such as distortion of the -video image, pin-cushion distortion of the scanners, non-linear response of the scanner and inaccuracies in the user input, can be corrected simultaneously. Here, the accuracy of the correcting algorithm is greater, the larger the number of selected reference points.

Reference will be made to FIG. 2 in explanation of the classification of measurement points. A portion of the left-hand side of a vehicle can be seen here. This portion comprises a part of a car door 8, in the lower region, and the left-hand A-column 9 of the vehicle, in the upper region. In accordance with the invention, the scanning grid is adapted to the measured object, here comprising the car door 8 and the A-column 9. Correspondingly, the grid comprises two sub-grids. Of these, the first uniformly covers a rectangular surface of the car door 8. The second is a polynomial freely defined on the A-column 9.

In the vibration analysis, the amplitude, frequency and phase of the vibration are of interest. For an effective analysis, points assigned to the same vehicle part or points with a fixed phase relationship are to be combined with one another and classified in the same category. In the subsequent optical display (animation) this category can then be respectively displayed and analyzed independently, or optionally also in combination.

As it is to be expected that the vehicle door 8 and the A-column 9 will possess a different vibration characteristic, the measurement points located thereon are assigned to different categories via a classifying device 7 (FIG. 1). The categorization via the classifying device 7 is normally carried out by an operator. However, it can also take place automatically using modern imaging methods, or the operator can be assisted by these imaging methods in the classification process.

In addition to the illustrated example, it is also possible to form categories, for example of measurement points, respectively located on different read heads of a hard disc or on different cooling ribs of a cylinder.

Within the scope of the invention, the analysis unit 4, the calibrator 6 and the classifying device 7 can also be combined to form a central unit, for example in a computer.

An advantageous embodiment of the method comprises the following steps:

The measurement points are defined in the video image of the output device 5 via a routine. They are either selected manually or are arranged on the video image by an imaging program. The video image can consist of a stored or reconstructed real image. For real-time processing, simultaneous recording of the video image is advisable.

The points thus defined are assigned to their respective category (optionally with graphic support). This can preferably be effected by marking on the screen, and specifically before or after the measurement, as the classification is of primary importance for the analysis. If different categories are to be measured in relation to one another, or different measurement parameters are to be set for different categories, it is advisable for the classification to take place prior to the measurement.

Then, the measurement is carried out in a manner known per se, possibly taking into account the assigned categories.

Finally, the vibration modes are graphically displayed, separately according to categories.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A method for contact-free, optical displacement and/or vibration measurement of an object (3) by means of at least one interferometer (1) with at least one laser, at least one control unit which guides the laser beam to a plurality of points of the object (3) to be measured so that said object is scanned by the laser beam, and at least one output unit (5) for the high-resolution display of the measurement results, wherein, for a single scan, the measurement points are selectively positioned on the object (3) to be measured, individually and/or in at least one grid adaptable in its contour, in different groups of measuring points, the measuring points within each group to be analyzed in correlation with the other measuring points in the group, whereby the groups of measuring points are classified in different categories based on geometrical or vibrational response characteristics and are analyzed as a function of the category to which they are assigned.

2. The method according to claim 1, wherein the measurement points are positioned on defined curves.

3. The method according to claim 2, wherein in the output unit (5) the measurement points are based on a stored or real-time image for their positioning.

4. The method according to claim 3, wherein the groups of measurement points are determined on the basis of an image of the object (3) to be measured.

5. The method according to the claim 4, wherein the groups of measurement points are determined using an automatic image recognition method.

6. The method according to claim 1, wherein the measurement points are displayed in the output unit (5) for their positioning on the object (3) to be measured.

7. The method according to claim 6, wherein the position of the measurement points in the output unit (5) is calculated from their position on the object (3) to be measured via a correction process.

8. The method according to claim 7, wherein the correction process is a coordinate transformation.

9. The method according to claim 7, wherein for creation of the correction process, a set of values is formed containing positions of measurement points on the object (3) and their assigned positions in the high-resolution display of the output unit (5).

10. The method according to claim 1, wherein the groups of measurement points are determined in accordance with the expected or the measured vibration characteristic of different measurement points.

11. The method according to claim 10, wherein the classification of the groups of measuring points takes place prior to the scanning process, and the respective measurement points within each group are measured in accordance with the category to which they are assigned.

12. The method according to claim 1, wherein the groups of measurement points are determined on the basis of and image of the object (3) to be measured.

13. The method according to claim 12, wherein the groups of measurement points are determined using an automatic image recognition method.

14. The method according to claim 1, wherein calibration of the position of the measurement points on the object (3) to the position of said points in the high-resolution display of the output unit (5) is effected by preelecting a set of values containing positions of measurement points on the object (3) and their positions in the output unit (5).

15. An apparatus for contact-free, optical displacement and/or vibration measurement of an object (3), comprising at least one interferometer (1) with at least one laser, at least one control unit which guides the laser beam to a plurality of points of the object (3) to be measured so that said object is scanned by the laser beam, at least one output unit (5) for the high-resolution display of the measurement results and the measurement points selectively positioned on the object (3) individually and/or in at least one grid adaptable in its contour for a single scan, a classifying device (7) for classifying in different categories based on geometrical or vibrational response characteristics groups of measurement points to be analyzed in correlation with one another and an analysis unit (4) for analyzing the groups of measurement points as a function of the category to which they are assigned.

16. The apparatus according to claim 15, further comprising a calibrator (6) which assigns the position of the measurement points on the object to the position of said points in the high-resolution display of the output unit (5).

17. The apparatus according to claim 15, wherein the output unit (5) has a connection to a video camera, an image memory and/or a CAD system.

* * * * *